(12) United States Patent
Kanai

(10) Patent No.: US 11,922,080 B2
(45) Date of Patent: Mar. 5, 2024

(54) TRANSMISSION OF PRINTING DATA TO WHICH LOCATION INFORMATION HAS BEEN ADDED AND RETAINING LOCATION INFORMATION

(71) Applicant: NEC Corporation, Tokyo (JP)

(72) Inventor: Masayuki Kanai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/925,910

(22) PCT Filed: May 24, 2021

(86) PCT No.: PCT/JP2021/019621
§ 371 (c)(1),
(2) Date: Nov. 17, 2022

(87) PCT Pub. No.: WO2021/241503
PCT Pub. Date: Dec. 2, 2021

(65) Prior Publication Data
US 2023/0176797 A1      Jun. 8, 2023

(30) Foreign Application Priority Data
May 26, 2020   (JP) ................................ 2020-091050

(51) Int. Cl.
  *G06F 3/00*       (2006.01)
  *G06F 3/12*       (2006.01)
(52) U.S. Cl.
  CPC .......... *G06F 3/1222* (2013.01); *G06F 3/1238* (2013.01); *G06F 3/1288* (2013.01)
(58) Field of Classification Search
  CPC .... G06F 3/1238; G06F 3/1288; G06F 3/1285; G06F 3/048; G06F 21/305; G06F 2203/0383

USPC ....................................................... 358/1.15
See application file for complete search history.

(56) References Cited

U.S. PATENT DOCUMENTS

2007/0168514 A1* 7/2007 Cocotis ..................... H04L 9/40
                                                    709/225

FOREIGN PATENT DOCUMENTS

| JP | 2007-207131 A | 8/2007 |
| JP | 2008-046918 A | 2/2008 |
| JP | 2013-140603 A | 7/2013 |

(Continued)

OTHER PUBLICATIONS

International Search Report for PCT Application No. PCT/JP2021/019621, dated Jul. 6, 2021.

*Primary Examiner* — Jamares Q Washington

(57) ABSTRACT

A printing system including: a location registration equipment (11) that performs user authentication of a user who operates a client terminal (14) at a workspace (100); a remote desktop server (12) that enables a desktop screen of an office-installed terminal to be operated through the client terminal (14); and a printing device (13) that outputs printing data in accordance with a printing request, wherein the location registration equipment (11) transmits location information of a user for whom it has performed user authentication to the printing device (13), and the printing device (13) transmits, when it receives a printing request from the remote desktop server (12), printing data to which the location information is added to the location registration equipment (11).

7 Claims, 4 Drawing Sheets

(56) References Cited

FOREIGN PATENT DOCUMENTS

| | | | |
|---|---|---|---|
| JP | 2016-184439 | A | 10/2016 |
| JP | 2019-155610 | A | 9/2019 |

* cited by examiner

TRANSMISSION OF PRINTING DATA TO WHICH LOCATION INFORMATION HAS BEEN ADDED AND RETAINING LOCATION INFORMATION

This application is a National Stage Entry of PCT/JP2021/019621 filed on May 24, 2021, which claims priority from Japanese Patent Application 2020-091050 filed on May 26, 2020, the contents of all of which are incorporated herein by reference, in their entirety.

TECHNICAL FIELD

The present disclosure relates to a printing system, a printing control apparatus, a printing method, and a program.

BACKGROUND ART

In recent years, teleworking has been promoted. An example of a method for realizing teleworking is a remote desktop through which a user boots up and operates an office-installed client terminal from outside the office. When working through a remote desktop, it may be necessary to print out documents and other materials at the workspace.

For example, Patent Literature 1 discloses a technique of printing out data, which is transmitted from a remote desktop server, from a printer installed at a location outside an office.

CITATION LIST

Patent Literature

Patent Literature 1: Japanese Unexamined Patent Application Publication No. 2013-140603

SUMMARY OF INVENTION

However, in the technique disclosed in Patent Literature 1, a remote desktop server and a printer communicate directly with each other, which may cause security problems.

The present disclosure has been made in view of the problem mentioned above, and an object of the present disclosure is to provide a printing system, a printing control apparatus, a printing method, and a program that enables printing to be performed more safely.

An aspect of the present disclosure is a printing system including:

a location registration equipment that performs user authentication of a user who operates a client terminal at a workspace;

a remote desktop server that enables a desktop screen of an office-installed terminal to be operated through the client terminal; and a printing device that outputs printing data in accordance with a printing request, wherein the location registration equipment transmits location information of a user for whom it has performed user authentication to the printing device, and the printing device transmits, when it receives a printing request from the remote desktop server, printing data to which the location information is added to the location registration equipment.

An aspect of the present disclosure is a printing control apparatus including:

a location registration equipment that performs user authentication of a user who operates a client terminal at a workspace; and a printing device that outputs printing data in accordance with a printing request, wherein the location registration equipment transmits location information of a user for whom it has performed user authentication to the printing device, and the printing device transmits, when it receives a printing request from a remote desktop server that enables a desktop screen of an office-installed terminal to be operated through the client terminal, printing data to which the location information is added to the location registration equipment.

An aspect of the present disclosure is a printing method including performing, by a computer, steps of:

transmitting location information of a user for whom user authentication has been performed to a printing device; and transmitting printing data to which the location information is added to a location registration equipment.

An aspect of the present disclosure is a program that causes a computer to perform steps of:

transmitting location information of a user for whom user authentication has been performed to a printing device; and transmitting printing data to which the location information is added to a location registration equipment.

According the present disclosure, it is possible to provide a printing system, a printing control apparatus, a printing method, and a program that enables printing to be performed more safely.

EXAMPLE EMBODIMENT

The following will describe example embodiments of the present invention with reference to the drawings. In each drawing, the same or corresponding elements are designated by the same reference symbols, and duplicate description will be omitted as necessary for clarification of the description.

First Example Embodiment

Figure 1:
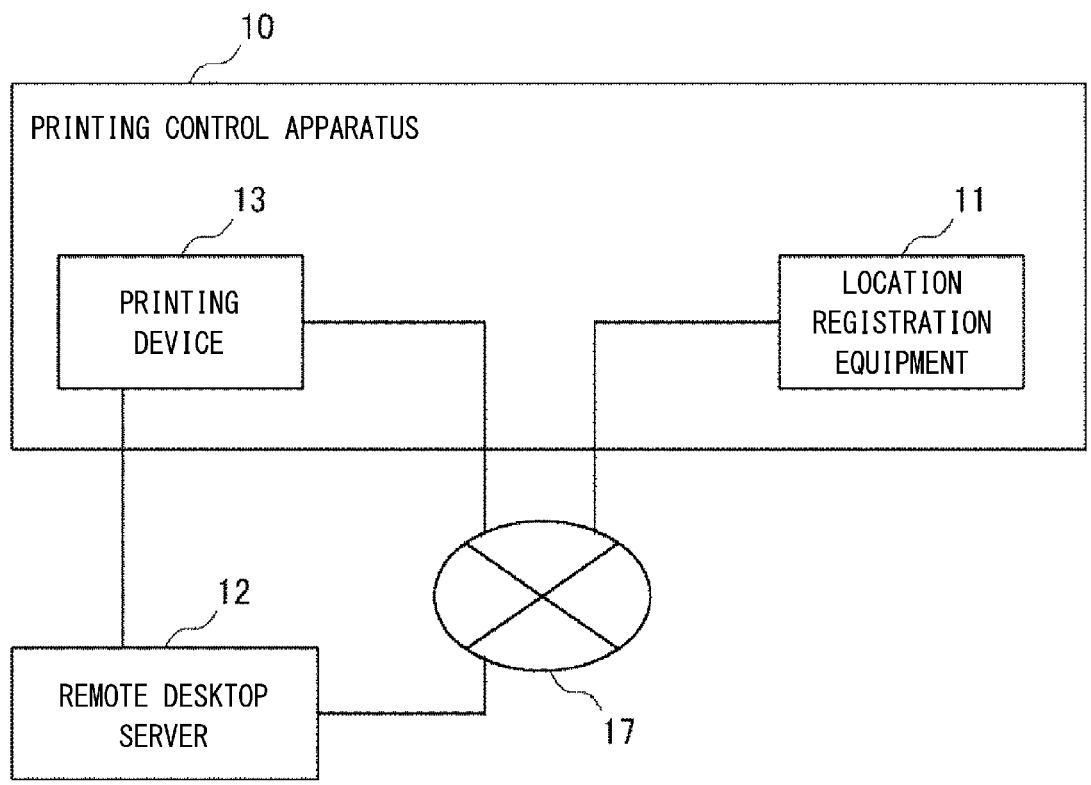
FIG. 1 is a block diagram showing a configuration of a printing system according to a first example embodiment.

FIG. 1 is block diagram showing a configuration of a printing system according to a first example embodiment. As shown in FIG. 1, a printing system 1 includes a printing control apparatus 10 and a remote desktop server 12. The printing control apparatus 10 includes a location registration equipment 11 and a printing device 13. The location registration equipment 11, the remote desktop server 12, and the printing device 13 are connected with each other through a network 17. The network 17 may be wired or wireless. A client terminal 14, a printer 16, and the like that are not illustrated are connected to the network 17. Note that the location registration equipment 11, the client terminal 14, and the printer 16 are installed at a workspace 100.

The location registration equipment 11 is a device that performs user authentication of a user. After user authentication succeeds, the user operates the client terminal 14 installed at the workspace 100. The authentication method for the location registration equipment 11 is not particularly limited as long as the user can be authenticated. The location registration equipment 11 authenticates a user by, for example, card authentication. Alternatively, the location registration equipment 11 may authenticate a user by a password or the like.

The remote desktop server 12 is a server that enables the desktop screen of an office-installed terminal (not illustrated) to be operated through the client terminal 14. The user can boot up and operate the office-installed terminal through the remote desktop server 12 by operating the client terminal 14. The printing device 13 outputs printing data in accordance with a printing request.

Figure 2:
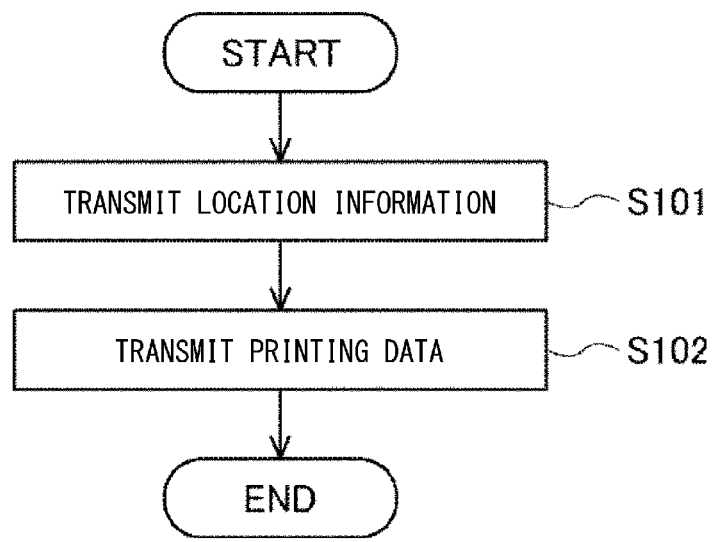
FIG. 2 is a flowchart showing a flow of a printing method according to the first example embodiment.

FIG. 2 is a flowchart showing a flow of a printing method according to the first example embodiment. The user performs user authentication using the location registration equipment 11 when starting work at the workspace 100. The location registration equipment 11 transmits the location information of a user for whom user authentication has been successful to the printing device 13 (Step S101). The location information is information about each device installed at the workspace 100 where the user is working.

When user wants to print documents and other materials, the user transmits a printing request to the remote desktop server 12 by operating the client terminal 14. The remote desktop server 12 transfers the printing request it has received to the printing device 13. The printing device 13 transmits the printing data it has received from the remote desktop server 12 to the location registration equipment 11 (Step S102). The location registration equipment 11 makes the printer 16 installed at the workspace 100 print out the printing data it has received. As described above, in the printing method according to this example embodiment, the printer 16 and the client terminal 14 etc. do not communicate directly with one another. Therefore, for example, even in the case where a malicious program or the like intrudes into the printer 16, the client terminal 14, the remote desktop server 12, and the printing device 13 are not attacked directly. Therefore, the printing method according to this embodiment enables printing to be performed more safely Note that the printing control apparatus 10 includes a processor, a memory, and a storage device that are not illustrated. Further, the aforementioned storage device stores a computer program in which processing of the printing method according to this example embodiment is implemented. Then, aforementioned processor reads the computer program from the storage device into the memory and executes the aforementioned computer program. By this configuration, functions of the printing control apparatus 10 are realized.

Further, some or all of the structural elements of the devices included in the printing system according to the present example embodiment may be realized by a general-purpose or dedicated circuitry, a processor, or the like or a combination thereof. They may be configured of a single chip or may be configured of a plurality of chips that are connected with one another through a bus. Some or all of the structural elements of the devices may be realized by a combination of the above-described circuit and the like and the program. Further, CPU (Central Processing Unit), GPU (Graphics Processing Unit), FPGA (field-programmable gate array), or the like may be used as the processor.

Further, in the case where some or all of the devices and the structural elements of the printing control apparatus 10 are realized by a plurality of information processing devices, circuits, and the like, and the plurality of the information processing devices, the circuits, and the like may be arranged in a centralized manner or in a distributed manner. For example, the information processing devices and the circuits may be realized by a form in which a client-server system, a cloud computing system, and the like are connected with one another via a communication network. Further, the function of the printing control apparatus 10 may be provided in a form of SaaS (Software as a Service).

Second Example Embodiment

Figure 3:
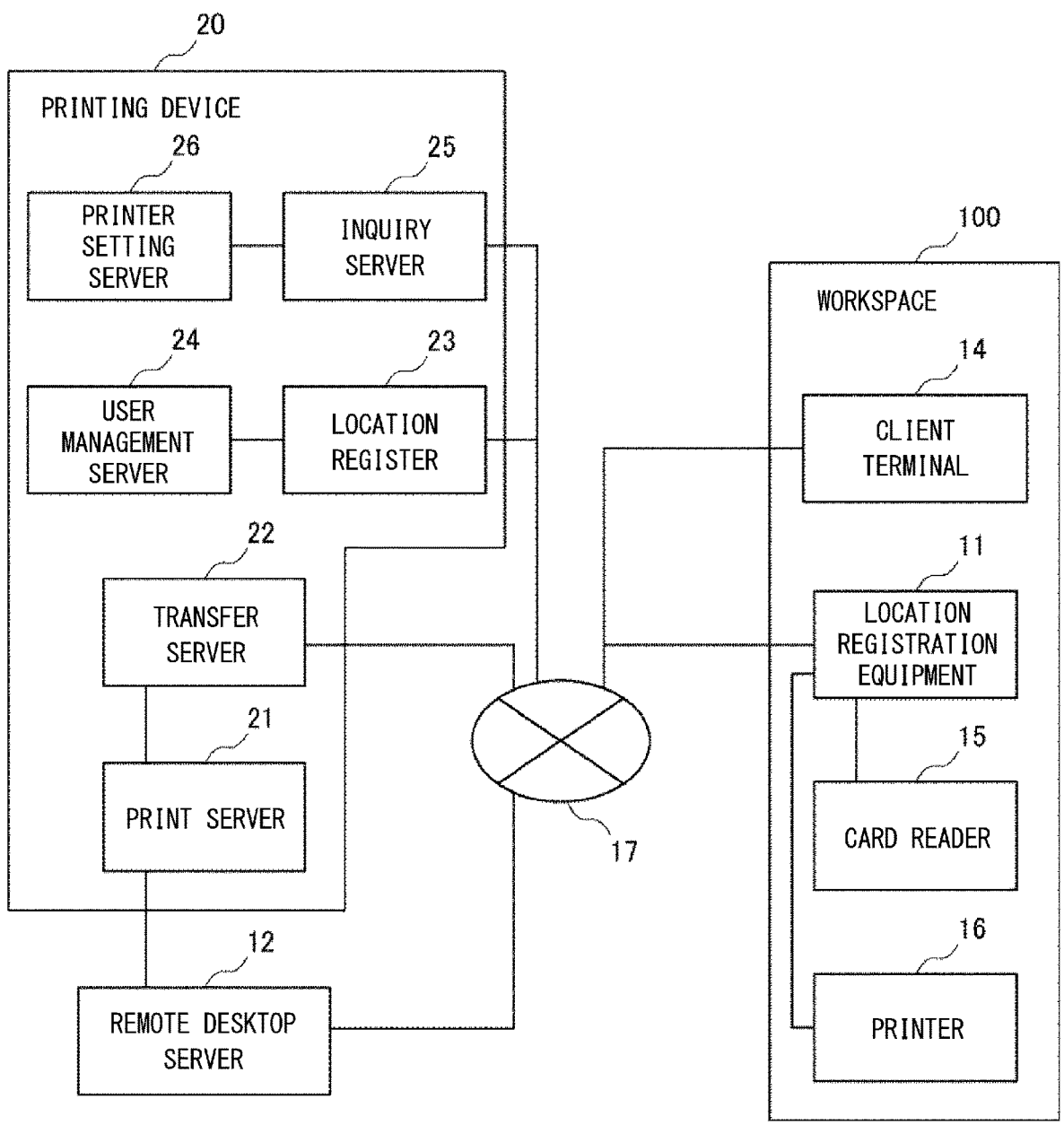
FIG. 3 is block diagram showing a configuration of a printing system according to a second example embodiment.

A second example embodiment is a specific example of the aforementioned first example embodiment. FIG. 3 is block diagram showing a configuration of a printing system according to the second example embodiment. As shown in FIG. 3, the printing system 2 includes the location registration equipment 11, the remote desktop server 12, and a printing device 20. The location registration equipment 11, the remote desktop server 12, and the printing device 20 are connected with each other through the network 17. Note that explanations duplicating those of the first example embodiment will be omitted as appropriate.

The location registration equipment 11 is connected to a card reader 15. A user performs user authentication by having the card reader 15 read a card for authentication. The printing device 20 includes a print server 21, a transfer server 22, a location register 23, a user management server 24, an inquiry server 25, and a printer setting server 26.

Upon receiving a printing request, the remote desktop server 12 requests the print server 21 to print out printing data. The print server 21 is a server that outputs printing data. The print server 21 transmits the printing data to the transfer server 22. The transfer server 22 transmits the printing data to the inquiry server 25 through the network 17.

The user management server 24 manages the location information of a user. The location register 23 retains the location information that has been authenticated. The location register 23 compares the location information received from the location registration equipment 11 with the location information managed by the user management server and when they match each other, retains the received location information. The inquiry server 25 inquires the location register 23 about the location information retained by the location register 23 and adds the aforementioned location information to the printing data. The printer setting server 26 manages the setting information of the printer 16. The inquiry server 25 adds, to the printing data, the setting information acquired by inquiring the printer setting server 26.

Figure 4:
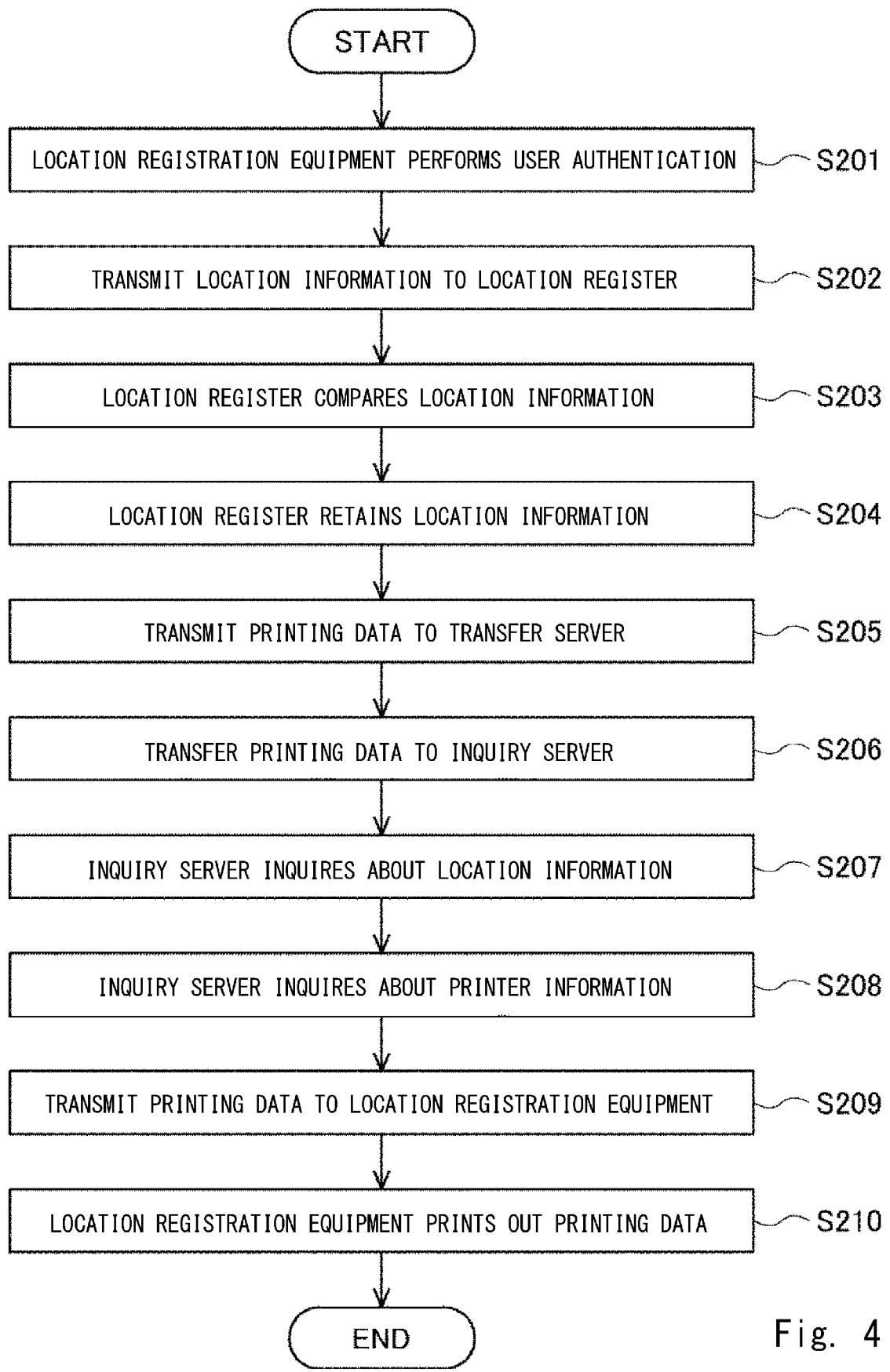
FIG. 4 is a flowchart showing a flow of a printing method according to a second example embodiment.

FIG. 4 is a flowchart showing a flow of a printing method according to the second example embodiment. In this example embodiment, a user has the card reader 15 read a card for authentication when he/she starts work at the workspace 100. The location registration equipment 11 performs user authentication based on the information read by the card reader 15 (Step S201). The location registration equipment 11 transmits the location information of a user for whom user authentication has been successful to the location register 23 (Step S202). The location register 23 compares the location information it has received with the information managed by the user management server 24 (Step S203). In Step S203, when the location information received from the location registration equipment 11 matches the location information stored in the user management server 24, the location register 23 retains the received location information (Step S204).

The user boots up an unillustrated office-installed client terminal using the remote desktop server 12 and works remotely using the remote desktop. When the user wants to print documents and other materials, the user transmits a printing request to the remote desktop server 12 by operating the client terminal 14. Upon receiving the printing request, the remote desktop server 12 transfers the printing request it has received to the print server 21. When the print server 21 receives the printing request, the print server 21 transmits the printing data to the transfer server 22 (Step S205). The printing data includes user information of the user who has made the printing request. The transfer server 22 transfers the printing data it has received to the inquiry server 25 (Step S206).

Based on the user information included in the printing data, the inquiry server 25 inquires the location register 23 about the location information of the user (Step S207). The location information includes the printer type of the printer 16 installed at the workspace 100. The inquiry server 25 converts the printing data so that it matches the acquired printer type. In accordance with the printer type of the printer 16, the inquiry server 25 inquires the printer setting server 26 about the printer information necessary for printing on the printer 16 and acquires the printer information (Step S208). Next, the inquiry server 25 adds the location information and the printer information to the printing data and transmits the printing data to the location registration equipment 11 (Step S209). The location registration equipment 11 makes the printer 16 print out the printing data based on the received location information (Step S210).

As described above, in the printing method according to this embodiment, the printing data including the printer information about the printer 16 is transmitted from the printing device 20 to the location registration equipment 11. Therefore, printing can be performed without having the devices other than the location registration equipment 11 communicate directly with the printer 16. Further, in the printing system according to this embodiment, the location information of a user for whom user authentication has been successful is retained by the location register 23 and the retained location information is added to the printing data. Therefore, only the user for whom user authentication has been successful can perform printing. Further, the printing system according to this embodiment can achieve the same effect as that described in the first example embodiment.

Although the present invention has been described as a hardware configuration in the above example embodiments, the present invention is not limited thereto. The present invention can also be realized by causing a CPU to execute a computer program for performing any processing.

The above-described program can be stored by using any of various types of non-transitory computer-readable media and supplied to a computer. The non-transitory computer-readable media include various types of tangible storage media. Examples of non-transitory computer-readable media include magnetic storage media (specifically, flexible disks, magnetic tapes, and hard disk drives), magneto-optical storage media (specifically, magneto-optical disks), CD-ROM (Read Only Memory), CD-R, CD-R/W, DVD (Digital Versatile Disc), semiconductor memory (specifically, mask ROM, PROM (Programmable ROM), EPROM (Erasable PROM)), flash ROM, and RAM (Random Access Memory). The program may also be supplied to a computer through any of various types of transitory computer-readable media. Examples of the transitory computer-readable media include electrical, optical, and electromagnetic waves. The transitory computer-readable media can supply the program to a computer via a wired communication path, such as an electric wire and an optical fiber, or a wireless communication path.

Note that the present invention is not limited to the above-described example embodiments, and may be changed as appropriate without departing from the principle of the present invention. Further, the present disclosure may be implemented by combining the example embodiments as appropriate.

This application is based upon and claims the benefit of priority from Japanese patent application No. 2020-091050, filed on May 26, 2020, the entire contents of which are incorporated herein by reference.

REFERENCE SIGNS LIST 1, 2 PRINTING SYSTEM
10 PRINTING CONTROL APPARATUS
11 LOCATION REGISTRATION EQUIPMENT
12 REMOTE DESKTOP SERVER
13 PRINTING DEVICE
14 CLIENT TERMINAL
15 CARD READER
16 PRINTER
17 NETWORK
20 PRINTING DEVICE
21 PRINT SERVER
22 TRANSFER SERVER
23 LOCATION REGISTER
24 USER MANAGEMENT SERVER
25 INQUIRY SERVER
26 PRINTER SETTING SERVER
100 WORKSPACE

What is claimed is:

1. A printing system comprising:
    location registration equipment that performs user authentication of a user who operates a client terminal at a workspace;
    a remote desktop server that enables a desktop screen of an office-installed terminal to be operated through the client terminal; and
    a printing device that outputs printing data in accordance with a printing request, the printing device including:
        a user management server that manages location information of the user; and
        a location register that retains the location information of an authenticated user, wherein
    the location registration equipment transmits the location information of the user for whom the location registration equipment has performed the user authentication to the printing device,
    the printing device transmits, when receiving the printing request from the remote desktop server, the printing data to which the location information has been added to the location registration equipment, and
    when the location information received from the location registration equipment matches the location information stored in the user management server, the printing device retains the location information within the location register.

2. The printing system according to claim 1, wherein the location information includes printer information, and the location registration equipment causes a printer installed at the workspace to print the printing data based on the printer information.

3. The printing system according to claim 1, wherein
the location information includes a printer type of a printer, and
the printing device transmits the printing data in a format that matches the printer type to the location registration equipment.

4. The printing system according to claim 1, wherein the printing device
includes a printer setting server that manages printer setting information of a printer,
acquires printer setting information of the printer installed in the working space from the printer setting server, and
adds the setting information to the printing data and transmits the printing device including the setting information that has been added to the location registration equipment.

5. A printing control apparatus comprising:
location registration equipment that performs user authentication of a user who operates a client terminal at a workspace; and
a printing device that outputs printing data in accordance with a printing request, the printing device including:
a user management server that manages location information of the user; and
a location register that retains the location information of an authenticated user wherein
the location registration equipment transmits the location information of the user for whom the location registration equipment has performed the user authentication to the printing device,
the printing device transmits, when receiving the printing request from a remote desktop server that enables a desktop screen of an office-installed terminal to be operated through the client terminal, the printing data to which the location information has been added to the location registration equipment, and when the location information received from the location registration equipment matches the location information stored in the user management server, the printing device retains the location information within the location register.

6. The printing control apparatus according to claim 5, wherein
the location information includes printer information, and
the location registration equipment causes a printer installed at the workspace print out the printing data based on the printer information.

7. A printing method comprising:
performing, by location registration equipment, user authentication of a user who operates a client terminal at a workspace;
enabling, by a remote desktop server, a desktop screen of an office-installed terminal to be operated through the client terminal;
outputting, by the printing device, printing data in accordance with a printing request
managing, by a user management server of the printing device, location information of the user;
retaining, by a location register of the printing device, the location information of an authenticated user;
transmitting, by the location registration equipment, the location information of the user for whom the location registration equipment has performed the user authentication to the printing device;
transmitting, by the printing device, when receiving the printing request from the remote desktop server, the printing data to which the location information has been added to the location registration equipment; and
retaining, by the printing device, when the location information received from the location registration equipment matches the location information stored in the user management server, the location information within the location register.

* * * * *